(12) United States Patent
Huang et al.

(10) Patent No.: US 7,986,852 B2
(45) Date of Patent: Jul. 26, 2011

(54) IMAGE PROCESSING APPARATUS AND METHOD FOR ADJUSTING A LIGHTNESS AND AN INPUT IMAGE

(75) Inventors: Yu-Hsiang Huang, Taipei Shien (TW); Hsin-Hun Lee, Kaohsiung Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 1079 days.

(21) Appl. No.: 11/808,494

(22) Filed: Jun. 11, 2007

(65) Prior Publication Data
US 2008/0044101 A1 Feb. 21, 2008

(30) Foreign Application Priority Data
Aug. 16, 2006 (TW) ............................... 95130027 A (51) Int. Cl.
*G06K 9/40* (2006.01)
(52) U.S. Cl. ........ 382/274; 382/162; 382/254; 345/589; 345/600; 345/601; 348/630; 348/631; 348/645; 348/649; 348/687; 358/3.23; 358/518; 358/520
(58) Field of Classification Search .................. None
See application file for complete search history.

(56) References Cited

U.S. PATENT DOCUMENTS

| | | | |
|---|---|---|---|
| 5,060,060 A | 10/1991 | Udagawa et al. | |
| 5,355,225 A * | 10/1994 | Bachmann et al. | 348/645 |
| 5,995,655 A | 11/1999 | Lockett et al. | |
| 6,172,681 B1 * | 1/2001 | Ueda | 345/589 |
| 7,177,465 B1 * | 2/2007 | Takahira | 382/166 |
| 7,193,659 B2 * | 3/2007 | Huang et al. | 348/649 |
| 2002/0085750 A1 * | 7/2002 | Hoshuyama | 382/162 |
| 2003/0012433 A1 * | 1/2003 | Gruzdev et al. | 382/167 |
| 2004/0120576 A1 * | 6/2004 | Kim | 382/167 |

* cited by examiner

*Primary Examiner* — Sath V Perungavoor
*Assistant Examiner* — Jason Heidemann
(74) *Attorney, Agent, or Firm* — Thomas|Kayden (57) ABSTRACT

The invention discloses an image processing apparatus for adjusting the lightness of an input image which has a hue. The image processing apparatus includes a look-up table, a processing unit and an adder. The look-up table records M lightness, N hues and M*N corresponding lightness offset values. The processing unit is used for storing the look-up table and for selecting a corresponding lightness offset value from the look-up table according to the lightness and the hue of the input image. The adder is coupled to the processing unit and used for adding the selected lightness offset value to the lightness of the input image, so as to obtain an adjusted lightness. Accordingly, the image quality is improved.

12 Claims, 7 Drawing Sheets

Lightness
L=37

Lightness
L=59

Lightness
L=85

| L \ H | H1 | H2 | H3 | ... | HN |
|---|---|---|---|---|---|
| L1 | L_off_11 | L_off_21 | L_off_31 | ... | L_off_N1 |
| L2 | L_off_12 | L_off_22 | L_off_32 | ... | L_off_N2 |
| L3 | L_off_13 | L_off_23 | L_off_33 | ... | L_off_N3 |
| ... | ... | ... | ... | ... | ... |
| LM | L_off_1M | L_off_2M | L_off_3M | ... | L_off_NM |

| L＼H | 0~20 | 21~40 | 41~60 | ... | 341~359 |
|---|---|---|---|---|---|
| 0~10 | L_off_11 | L_off_21 | L_off_31 | ... | L_off_181 |
| 11~20 | L_off_12 | L_off_22 | L_off_32 | ... | L_off_182 |
| 21~30 | L_off_13 | L_off_23 | L_off_33 | ... | L_off_183 |
| 31~40 | L_off_14 | L_off_24 | L_off_34 | ... | L_off_184 |
| 41~50 | L_off_15 | L_off_25 | L_off_35 | ... | L_off_185 |
| 51~60 | L_off_16 | L_off_26 | L_off_36 | ... | L_off_186 |
| 61~70 | L_off_17 | L_off_27 | L_off_37 | ... | L_off_187 |
| 71~80 | L_off_18 | L_off_28 | L_off_38 | ... | L_off_188 |
| 81~90 | L_off_19 | L_off_29 | L_off_39 | ... | L_off_189 |
| 91~99 | L_off_20 | L_off_30 | L_off_40 | ... | L_off_190 |

FIG. 7

IMAGE PROCESSING APPARATUS AND METHOD FOR ADJUSTING A LIGHTNESS AND AN INPUT IMAGE

BACKGROUND OF THE INVENTION

1. Field of the Invention

The invention relates to an image processing apparatus and a method of the same, and more particularly, to an image processing apparatus and a method which can adjust lightness of an input image, and then adjust saturation of the input image according to the adjusted lightness.

2. Description of the Prior Art

Figure 1:
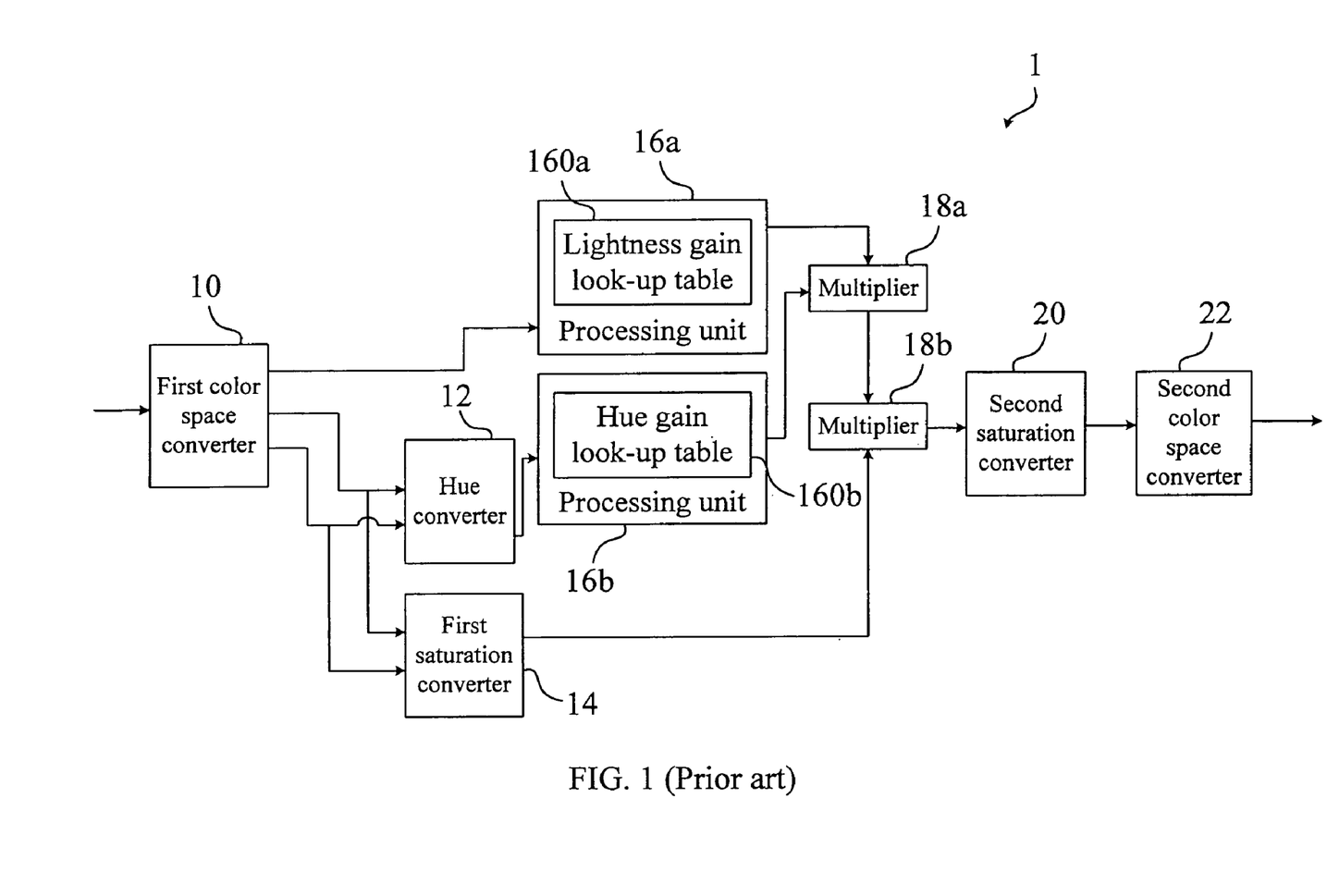
FIG. 1 is a functional block diagram of the image processing apparatus according to prior art.
Figure 2A:
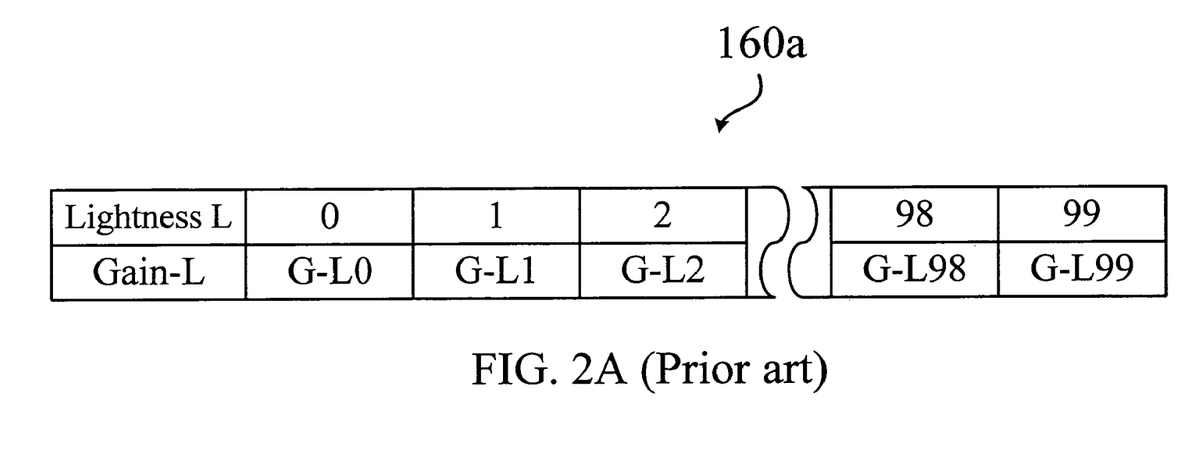
FIG. 2A is a schematic diagram of the lightness gain look-up table shown in FIG. 1.
Figure 2B:
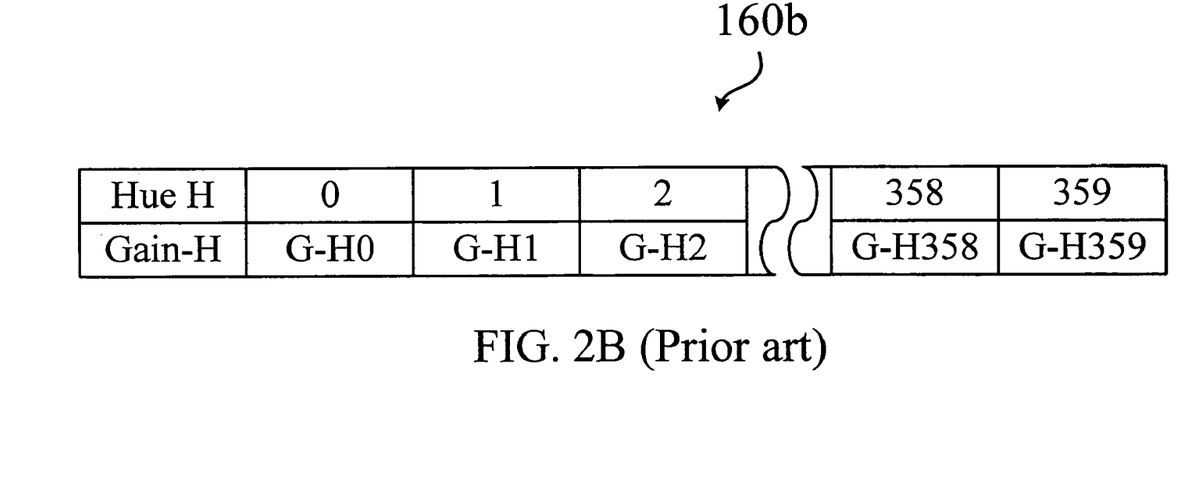
FIG. 2B is a schematic diagram of the hue gain look-up table shown in FIG. 1.

In current displays, all users can adjust color saturations via an on screen display (OSD) for enhancing displaying effects of images. Please refer to FIG. 1, FIG. 2A and FIG. 2B. FIG. 1 is a functional block diagram of an image processing apparatus 1 according to prior art. FIG. 2A is a schematic diagram of the look-up table of lightness gain 160a shown in FIG. 1. FIG. 2B is a schematic diagram of the look-up table of hue gain 160b shown in FIG. 1. The image processing apparatus 1 includes a first color space converter 10, a hue converter 12, a first saturation converter 14, processing units 16a and 16b, multipliers 18a and 18b, a second saturation converter 20, and a second color space converter 22. The processing unit 16a can store the lightness gain look-up table 160a, as shown in FIG. 2A, and the processing unit 16b can store the hue gain look-up table 160b, as shown in FIG. 2B.

The first color space converter 10 is used for converting an input image from RGB color space into Lab color space, wherein L stands for a lightness component, and, a and b stand for color components respectively. The hue converter 12 is used for converting the color components a and b into a hue (H) of the input image, wherein the hue (H) is defined as $H=\tan^{-1}(b/a)$. The first saturation converter 14 is used for converting the color components a and b into a saturation (S) of the input image, wherein the saturation (S) is defined as $S=\sqrt{a^2+b^2}$.

The processing unit 16a determines a lightness gain (Gain-L) based on the lightness (L) of an input image and the look-up table of lightness gain 160a. The processing unit 16b determines a hue gain (Gain-H) based on the hue of the input image and the look-up table of hue gain 160b. Then, the multiplier 18a multiplies the lightness gain (Gain-L) by the hue gain (Gain-H) to generate a saturation gain (Gain-S). Afterward, the multiplier 18b multiplies the saturation gain (Gain-S) by the saturation of the input image to generate an adjusted saturation.

The second saturation converter 20 is used for converting the adjusted saturation into the color components a and b. Then, the second color space converter 22 converts the input image, from the second saturation converter 20, from Lab color space into RGB color space.

Figure 3A:
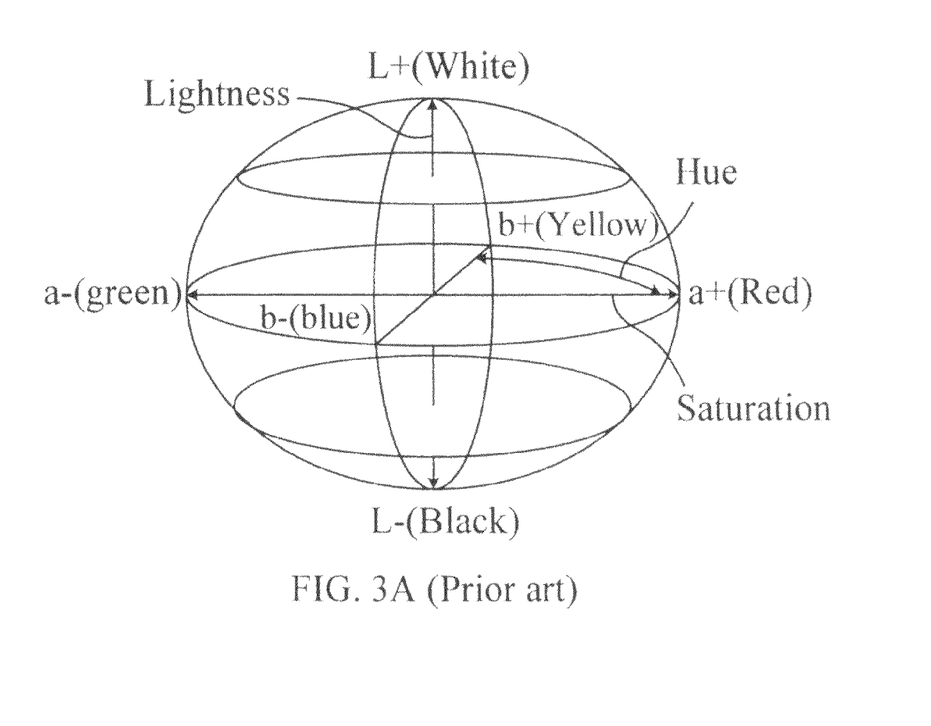
FIG. 3A is a schematic diagram of Lab color space.
Figure 3B:
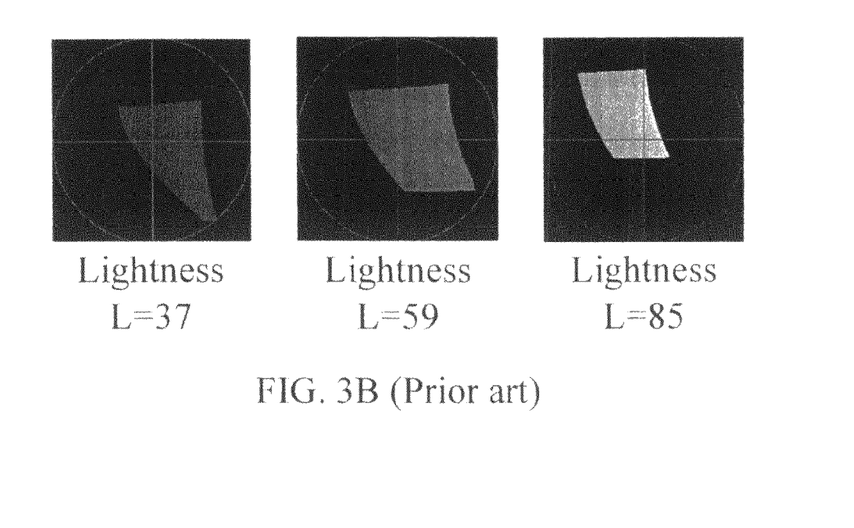
FIG. 3B is a schematic diagram of the saturation with different lightness and hues in Lab color space.

Please refer to FIG. 3A and FIG. 3B. FIG. 3A is a schematic diagram of Lab color space. FIG. 3B is a schematic diagram of a saturation with different lightness and hues in the Lab color space. As shown in FIG. 3A, in the Lab color space, the lightness (L) is controlled by heights, the hue (H) is controlled by angles, and the saturation (S) is controlled by radii. According to the above description, the image processing apparatus 1 of prior art uses the lightness gain (Gain-L) and the hue gain (Gain-H), respectively, to adjust the saturation of the input image. However, as shown in FIG. 3B, when the lightness of the input image is different, the saturation range of hue of the input image will be different accordingly. Because the section of the color space of each lightness is different and different hues (angles) have different saturation ranges, the lightness gain (Gain-L) is selected based on the lightness and the hue gain (Gain-H) is selected based on the hue would result in that the saturation is not easy to control and it leads to color deviations as well.

Besides, the image processing apparatus 1 of the prior art is used for adjusting saturation; therefore, users can not increase or decrease lightness according to their preference.

Accordingly, the scope of the invention is to provide an image processing apparatus and a method of the same to solve the above mentioned problems.

SUMMARY OF THE INVENTION

An object of the invention is to provide an image processing apparatus and a method of the same. The image processing apparatus adjusts the lightness of an input image according to the lightness and the hue of the input image simultaneously. In this way, better image quality can be achieved.

According to a preferred embodiment of the invention, the image processing apparatus is used for adjusting a lightness of an input image having a hue. The image processing apparatus includes a look-up table, a processing unit, and an adder.

In the above embodiment, the look-up table is used for recording M lightness, N hues, and M*N lightness offset values. Each of the M*N lightness offset values corresponds to one of the M lightness and one of the N hues respectively, wherein both M and N are nature numbers. The processing unit is used for storing the look-up table and selecting a corresponding lightness offset value from the look-up table according to the lightness and the hue of the input image. The adder is coupled to the processing unit, and is used for obtaining an adjusted lightness by adding the lightness of the input image to the corresponding lightness offset value.

Therefore, the image processing apparatus, according to the invention, adjusts the lightness of an input image based on both the lightness and the hue of the input image simultaneously to increase the lightness adjustment of colors of the input image and thus image quality can be achieved. Thus, better image quality can be achieved.

The advantage and spirit of the invention may be understood by the following recitations together with the appended drawings.

DETAILED DESCRIPTION OF THE INVENTION

Figure 4:
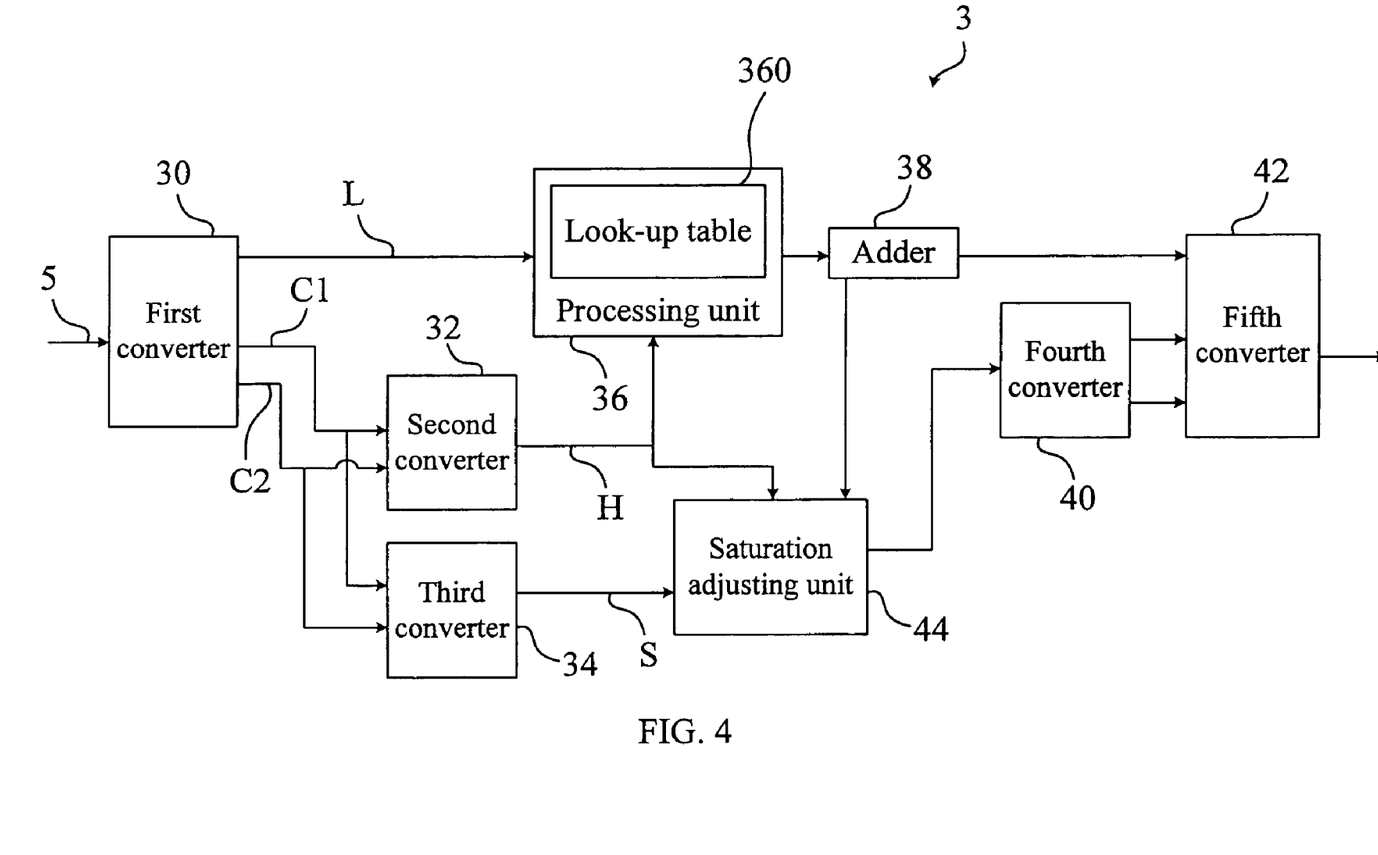
FIG. 4 is a functional block diagram of an image processing apparatus of the first preferred embodiment according to the invention.

Please refer to FIG. 4. FIG. 4 is a functional block diagram of an image processing apparatus 3 of the first preferred embodiment according to the invention. In this embodiment, the image processing apparatus 3 is used for adjusting the lightness (L) of an input image 5. The input image 5 has saturation (S) and hue (H). In this embodiment, the input image 5 is in compliance with RGB color space (the first color space).

As shown in FIG. 4, the image processing apparatus 3 includes a first converter 30, a second converter 32, a third converter 34, a processing unit 36, an adder 38, a fourth converter 40, a fifth converter 42, and a saturation adjusting unit 44. The processing unit 36 stores a look-up table 360 that records M lightness, N hues, and M*N lightness offset values. Each of the M*N lightness offset values respectively corresponds to one of the M lightness and one of the N hues, wherein both M and N are nature numbers.

The first converter 30 is coupled to the processing unit 36. And, the second converter 32 is coupled between the first converter 30 and the processing unit 36. The third converter 34 is coupled to the first converter 30. The saturation adjusting unit 44 is coupled to the second converter 32, the third converter 34, and the adder 38. The fourth converter 40 is coupled to the saturation adjusting unit 44. The fifth converter 42 is respectively coupled to the fourth converter 40 and the adder 38.

Figure 5:
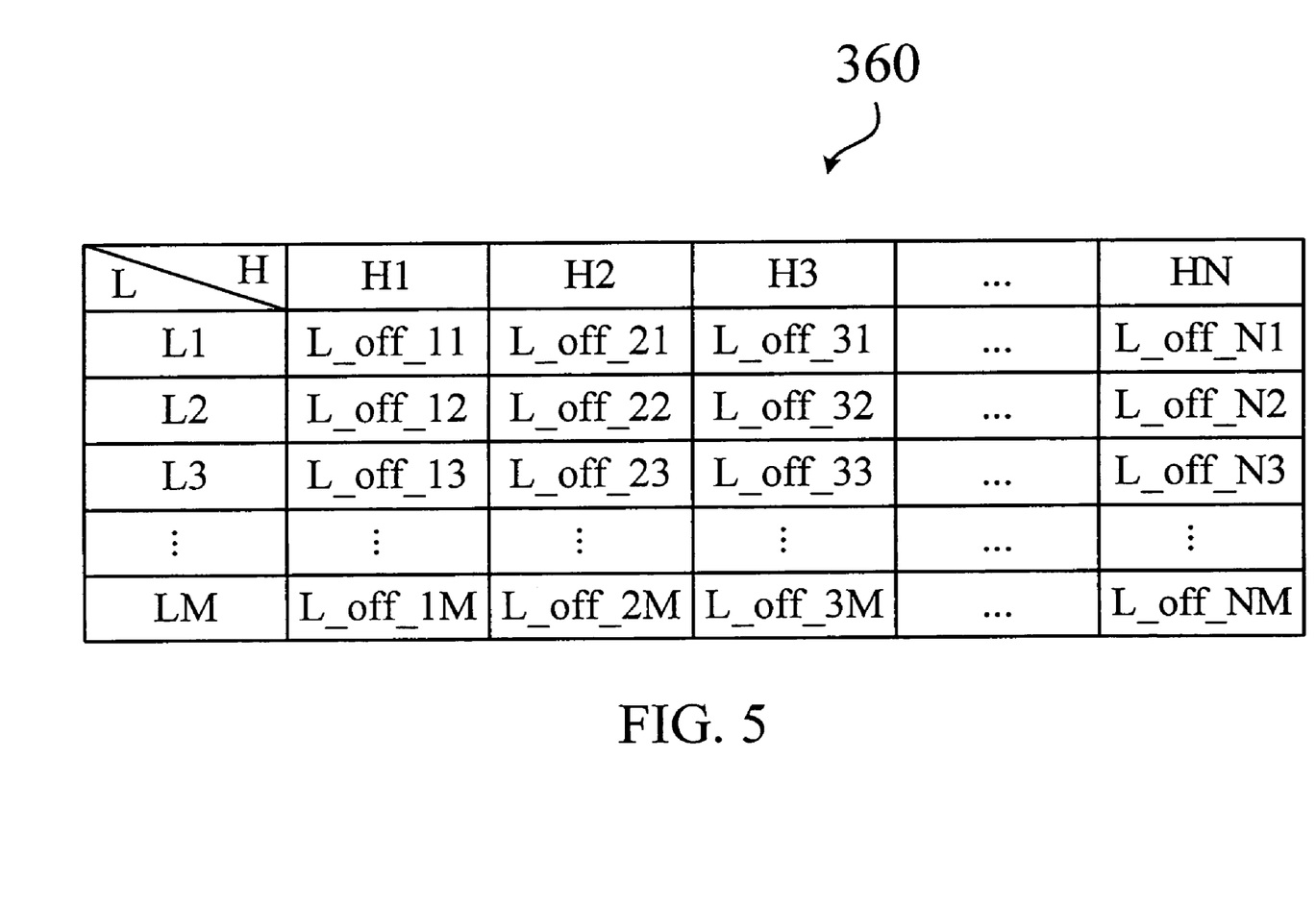
FIG. 5 is a schematic diagram of the look-up table shown in FIG. 4.

Please refer to FIG. 5. FIG. 5 is a schematic diagram of the look-up table 360 shown in FIG. 4. In the first embodiment above, M lightness (L1~LM), N hues (H1~HN), and M*N lightness offset values (L_off_11~L_off_NM) are recorded in the look-up table 360, as shown in FIG. 5. It should be noticed that the look-up table 360 can have different settings according to different needs. Each of the lightness offset values recorded in the look-up table 360 can be obtained by software simulation, and the details are not further described herein.

In the above first embodiment, the first converter 30 is used for converting the input image 5 from the RGB color space (the first color space) into a second color space with separated lightness and colors. The second color space is the one selected from a group consisting of a YCbCr color space, a Yuv color space, a YIQ color space, a CIELab color space, and an Luv color space. And, the second color space defines the lightness component (L) and the color components (C1 and C2).

The second converter 32 is used for converting the color components (C1 and C2) into the hue (H), wherein the hue (H) is defined as: $H=\tan^{-1}(C1/C2)$. The third converter 34 is used for converting the color components (C1 and C2) into a saturation (S), wherein the saturation (S) is defined as: $S=\sqrt{C1^2+C2^2}$. The processing unit 36 determines a corresponding lightness offset value according to the lightness (L) and hue (H) of input image 5 from the look-up table 360. For example, if the lightness value of input image 5 is L3 and the hue value of input image is H3, the processing unit 36 determines the corresponding lightness offset value L_off_33 according to the look-up table 360. Afterward, the adder 38 adds the lightness of input image 5 with the corresponding lightness offset value to obtain an adjusted lightness. By doing so, the lightness of input image can be adjusted according to the lightness and hue of input image simultaneously.

Afterward, according to the adjusted lightness and hue, the saturation adjusting unit 44 adjusts the saturation of input image 5 to obtain an adjusted saturation. The fourth inverter 40 converts the adjusted saturation into color components C1 and C2. At last, the fifth converter 42 converts the input image 5 from the second color space (e.g., a YCbCr color space, a Yuv color space, a YIQ color space, a CIELab color space, and a Luv color space) into the first color space (e.g., a RGB color space). In this way, the saturation of input image can be adjusted according to the adjusted lightness and hue simultaneously.

Figure 6:
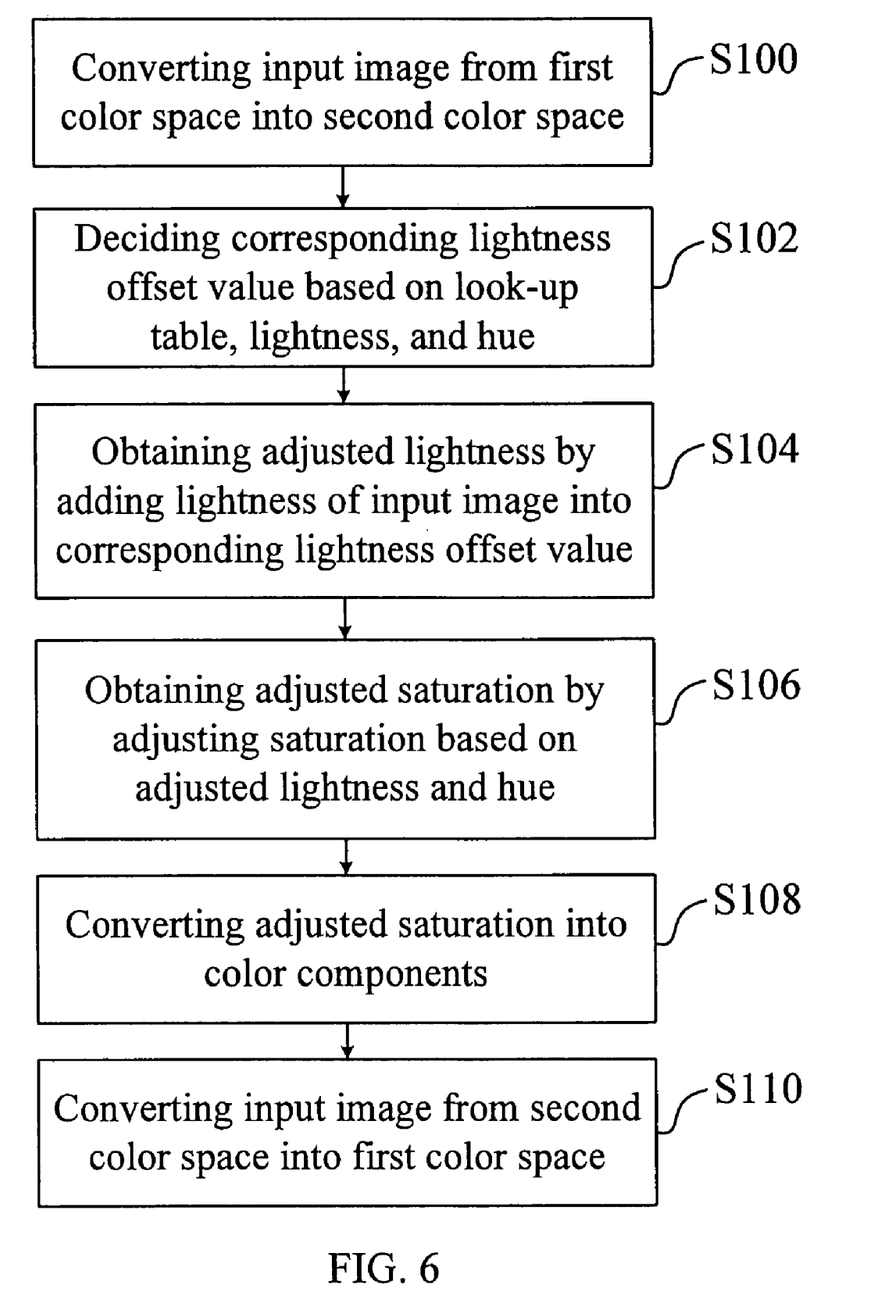
FIG. 6 is a flowchart of the image processing method of the first preferred embodiment according to the invention.

Please refer to FIG. 6. FIG. 6 is a flowchart of an image processing method of the first preferred embodiment according to the invention. Please refer to FIG. 4 and FIG. 5. The image processing method, according to the invention, is used for adjusting the lightness of the input image having a saturation and a hue. According to the above mentioned first preferred embodiment, the image processing method of the invention includes the steps of:

Step S100: converting the input image 5 from the first color space (e.g., an RGB color space) into a second color space (e.g., a YCbCr color space, a Yuv color space, a YIQ color space, a CIELab color space, or an Luv color space);

Step S102: deciding the corresponding lightness offset value according to the look-up table 360, the lightness (L), and the hue (H);

Step S104: obtaining an adjusted lightness by adding the lightness L of the input image 5 with the corresponding lightness offset value;

Step S106: obtaining an adjusted saturation by adjusting the saturation according to the adjusted lightness and hue;

Step S108: converting the adjusted saturation into the color components (C1 and C2);

Step S110: converting the input image 5 from the second color space into the first color space.

Figure 7:
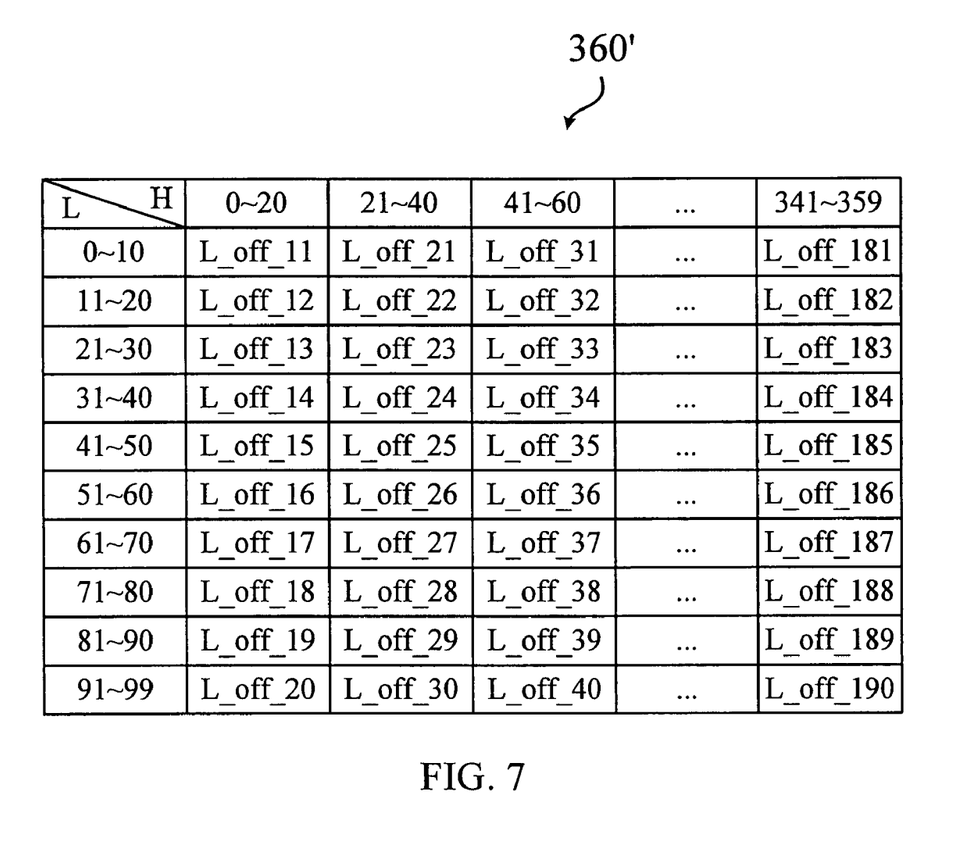
FIG. 7 is a schematic diagram of the look-up table of the second preferred embodiment according to the invention.

Please refer to FIG. 7. FIG. 7 is a schematic diagram of the look-up table 360' of the second preferred embodiment according to the invention. The major difference between the look-up table 360' and the look-up table 360 is that each of the lightness recorded in the look-up table 360' represents a lightness range, and each of the hues represents a hue range. As shown in FIG. 7, ten lightness ranges, eighteen hue ranges, and totally 10*18 lightness offset values are recorded in the look-up table 360'. For example, if the lightness value of input image 5 is 45 and the hue value is 30, the processing unit 36 will select the corresponding lightness offset value L_off_25 according to the look-up table 360'. However, it should be noticed that the look-up table 360' can have different settings for the lightness range, the hue range and the lightness offset value, according to different needs.

Compared with prior art, the image processing apparatus according to the invention adjusts the lightness of an input image in accordance with both the lightness and the hue of the input image simultaneously to increase the lightness adjustment of colors of the input image and thus image quality can be achieved. Besides, in the invention, because the saturation is adjusted based on the adjusted lightness, the color adjustment of the input image is more flexible, thus the image quality is better improved.

With the above example and explanation, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image processing apparatus for adjusting a lightness of an input image, the input image having a hue, the image processing apparatus comprising:

a look-up table therein recording M lightness, N hues, and M*N lightness offset values, each of the M*N lightness offset values respectively corresponding to one of the M lightness and one of the N hues, and both M and N being nature numbers;

a processing unit for storing the look-up table and selecting a corresponding lightness offset value from the look-up table according to the lightness and the hue of the input image;

an adder, coupled to the processing unit, for obtaining an adjusted lightness by adding the lightness of the input image to the corresponding lightness offset value;

a first converter coupled to the processing unit, the input image being in compliance with a first color space, the first converter being used for converting the input image from the first color space into a second color space, wherein the second color space defines a lightness component (L) and two color components (C1 and C2);

a second converter, coupled between the first converter and the processing unit, the second converter being used for converting the two color components (C1 and C2) into the hue (H), wherein the hue (H) is defined as follows:

$$H = \tan^{-1}\left(\frac{C1}{C2}\right);$$

a third converter, coupled to the first converter, the third converter being used for converting the two color components (C1 and C2) into a saturation (S) of the input image, wherein the saturation (S) is defined as follows:

$$S = \sqrt{C1^2 + C2^2};\text{ and}$$

a saturation adjusting unit respectively coupled to the second converter, the third converter, and the adder, the saturation adjusting unit being used for adjusting the saturation, according to the adjusted lightness and the hue, to obtain an adjusted saturation.

2. The image processing apparatus of claim 1, wherein each of the M lightness recorded in the look-up table represents a lightness range, and each of the N hues represents a hue range.

3. The image processing apparatus of claim 1, wherein the first color space is RGB color space.

4. The image processing apparatus of claim 1, wherein the second color space is the one selected from a group consisting of a YCbCr color space, a Yuv color space, a YIQ color space, a CIELab color space, and an Luv color space.

5. The image processing apparatus of claim 1, further comprising a fourth converter coupled to the saturation adjusting unit, the fourth converter being used for converting the adjusted saturation into the color components (C1 and C2).

6. The image processing apparatus of claim 5, further comprising a fifth converter respectively coupled to the fourth converter and the adder, the fifth converter being used for converting the input image from the second color space into the first color space.

7. An image processing method for adjusting a lightness of an input image, the input image having a hue, the image processing method comprising the steps of:
(a) determining a corresponding lightness offset values according the lightness and the hue from a look-up table, wherein the look-up table records M lightness, N hues, and M*N lightness offset values, and each of the M*N lightness offset values respectively corresponds to one of the M lightness and one of the N hues, both M and N are nature numbers;
(b) obtaining an adjusted lightness by adding the lightness of the input image to the corresponding lightness offset value; and
(c) adjusting a saturation, according to the adjusted lightness and the hue, for obtaining an adjusted saturation;
wherein the image processing method further comprises converting the input image from a first color space into a second color space before step (a), wherein the second color space defines a lightness component (L) and two color components (C1 and C2);
wherein according to the two color components (C1 and C2), the hue (H) is defined as follows:

$$H = \tan^{-1}\left(\frac{C1}{C2}\right);$$

wherein according to the two color components (C1 and C2), the saturation (S) of the input image is defined as follows:

$$S = \sqrt{C1^2 + C2^2}.$$

8. The image processing method of claim 7, wherein each of the M lightness recorded in the look-up table represents a lightness range, and each of the N hues represents a hue range.

9. The image processing method of claim 7, wherein the first color space is RGB color space.

10. The image processing method of claim 7, wherein the second color space is the one selected from a group consisting of a YCbCr color space, a Yuv color space, a YIQ color space, a CIELab color space, and an Luv color space.

11. The image processing method of claim 7, further comprising the step of:
(d) converting the adjusted saturation into the two color components (C1 and C2).

12. The image processing method of claim 11, further comprising the step of:
(e) converting the input image from the second color space into the first color space.

* * * * *